(12) United States Patent
Martus et al.

(10) Patent No.: US 8,132,638 B2
(45) Date of Patent: Mar. 13, 2012

(54) REAR DRIVE MODULE WHEEL DISCONNECT

(75) Inventors: Charles R. Martus, Oxford, MI (US); Ross K. Cheadle, Wixom, MI (US)

(73) Assignee: Eaton Corporation, Cleveland, OH (US)

( * ) Notice: Subject to any disclaimer, the term of this patent is extended or adjusted under 35 U.S.C. 154(b) by 239 days.

(21) Appl. No.: 12/245,263

(22) Filed: Oct. 3, 2008

(65) Prior Publication Data

US 2010/0084210 A1   Apr. 8, 2010

(51) Int. Cl.
*B60K 23/08* (2006.01)
*F16D 11/14* (2006.01)
*F16D 3/223* (2011.01)

(52) U.S. Cl. .... 180/247; 192/69.8; 192/84.7; 192/85.15

(58) Field of Classification Search .................. 180/247, 180/245; 192/49, 69.71, 69.8, 84.92, 85.18, 192/84.7, 85.14, 85.15
See application file for complete search history.

(56) References Cited

U.S. PATENT DOCUMENTS

| | | | | |
|---|---|---|---|---|
| 1,249,449 | A | * | 12/1917 | Middlebrook ................ 180/247 |
| 1,302,183 | A | * | 4/1919 | Lanham ........................... 192/50 |
| 2,770,150 | A | * | 11/1956 | Culverwell ................... 475/221 |
| 2,887,201 | A | * | 5/1959 | Willis ........................ 192/69.81 |
| 4,407,387 | A | * | 10/1983 | Lindbert ...................... 180/247 |
| 4,875,698 | A | | 10/1989 | Uchiyama |
| 4,991,678 | A | * | 2/1991 | Furuya et al. ................ 180/197 |
| 5,041,069 | A | * | 8/1991 | Horst ............................ 475/231 |
| 5,295,921 | A | * | 3/1994 | Ippolito et al. ............... 475/238 |
| 5,353,889 | A | | 10/1994 | Hamada |
| 5,456,641 | A | | 10/1995 | Sawase |
| 5,690,002 | A | | 11/1997 | Showalter |
| 5,692,590 | A | | 12/1997 | Iihara et al. |
| 5,713,446 | A | | 2/1998 | Organek et al. |
| 5,845,546 | A | | 12/1998 | Knowles et al. |

(Continued)

FOREIGN PATENT DOCUMENTS

EP   0869299 A2   10/1998

(Continued)

OTHER PUBLICATIONS

International Searching Authority/European Patent Office; International Search Report and Written Opinion mailed Mar. 4, 2010 in counterpart PCT/IB2009/007029.

*Primary Examiner* — Paul N Dickson
*Assistant Examiner* — Wesley Potter
(74) *Attorney, Agent, or Firm* — Dykema Gossett PLLC

(57) ABSTRACT

A wheel disconnect system is provided including a rear drive module and a constant velocity joint housing. The rear drive module includes a housing, at least one actuator, and at least one dog clutch. The dog clutch includes a first portion configured to move when the actuator is moved and a second portion configured for engagement with the first portion. The constant velocity joint housing is formed integrally with the second portion of the dog clutch. A wheel may be disconnected from the rear drive module unless engagement of the first and second portions of the dog clutch allows torque to be transferred to the wheel. In one embodiment, a hydraulically activated piston may be used to activate the first portion of the dog clutch. In another embodiment, a ball ramp may be used to activate the first portion of the dog clutch. A vehicle driveline including a wheel disconnect system is also provided.

18 Claims, 2 Drawing Sheets

U.S. PATENT DOCUMENTS

| | | | |
|---|---|---|---|
| 5,884,738 A | 3/1999 | Joslin et al. | |
| 5,894,904 A | 4/1999 | Yakou et al. | |
| 5,984,039 A | 11/1999 | Mayr | |
| 6,070,495 A | 6/2000 | Kuroda et al. | |
| 6,083,134 A * | 7/2000 | Godlew | 475/231 |
| 6,095,276 A | 8/2000 | Kuroda et al. | |
| 6,234,289 B1 * | 5/2001 | Baker et al. | 192/69.41 |
| 6,327,935 B1 | 12/2001 | Joslin et al. | |
| 6,349,809 B1 | 2/2002 | Isley, Jr. | |
| 6,450,915 B1 * | 9/2002 | Kazaoka et al. | 475/231 |
| 6,470,659 B2 * | 10/2002 | Shimamura et al. | 56/14.7 |
| 6,533,090 B2 * | 3/2003 | Osborn et al. | 192/48.2 |
| 6,817,434 B1 | 11/2004 | Sweet | |
| 7,111,702 B2 * | 9/2006 | Perlick et al. | 180/233 |
| 7,252,616 B2 | 8/2007 | Wormsbaecher | |
| 7,377,854 B2 | 5/2008 | Wormsbaecher | |

FOREIGN PATENT DOCUMENTS

| | | |
|---|---|---|
| EP | 1281560 A2 | 2/2003 |
| GB | 2181500 A | 4/1987 |
| GB | 2210341 A * | 6/1989 |
| GB | 2407804 | 9/2006 |
| WO | WO2008/115963 A1 | 9/2008 |

* cited by examiner

REAR DRIVE MODULE WHEEL DISCONNECT

TECHNICAL FIELD

The present invention relates to a wheel disconnect system, including a rear drive module wheel disconnect system including an integrated constant velocity (CV) joint.

BACKGROUND

A conventional AWD driveline for a motor vehicle may include a primary front drive axle coupled to a secondary or auxiliary rear drive axle. When the driveline is operating in a 4×2 mode of operation (i.e., four wheels, with two of them operating as driving wheels), the primary front drive axle must provide tractive forces not only to keep the motor vehicle moving, but also to overcome the frictional losses of the secondary or auxiliary rear drive axle that is being driven through the tire/road surface interface. Driveline losses may be due to oil churning losses, viscous drag, inertia, as well as friction.

In an effort to minimize loss and provide a more fuel efficient driveline when in a 4×2 mode of operation to improve overall fuel economy, it may be desirable to disconnect the secondary or auxiliary drive system, including the secondary or auxiliary rear drive axle and the rear wheels. Wheel hub disconnects generally may be separate from the rear differential housing and positioned close to each wheel, may be integrated into the rear differential housing, or may be somewhere in between the wheel and the rear differential housing. Accordingly, disconnecting the rear wheels may be accomplished at the ends of the wheels or at the output of a rear drive module (RDM).

A system that disconnects the rear wheels at the ends of the wheels may be more conventional and/or typical in motor vehicles, but may also be more complicated than a system that disconnects the wheels at the RDM. While a system that disconnects the wheels at the RDM may be acceptable since most of the system losses are internal to the RDM, such a system may undesirably increase the package size and component count of the wheel disconnect system. It may be desirable to provide a wheel disconnect system that disconnects the wheels at the output of the rear drive module, while managing to avoid an increased package size and component count.

SUMMARY

A wheel disconnect system may include a rear drive module and a constant velocity joint housing. The rear drive module may include a housing, at least one actuator at least partly disposed within the housing, and at least one dog clutch configured to be activated by the actuator. The dog clutch may include a first portion configured to move when the actuator is moved and a second portion configured for engagement with the first portion. The constant velocity joint housing may be formed integrally with the second portion of the dog clutch. A wheel may be disconnected from the rear drive module unless engagement of the first portion and the second portion of the dog clutch allows torque to be transferred to the wheel.

In an embodiment, a wheel disconnect system may include a rear drive module and a constant velocity joint housing. The rear drive module may include a housing defining a cavity configured to be in communication with a source of hydraulic fluid pressure, at least one piston disposed in the cavity, and at least one dog clutch configured to be activated by the piston. The piston may be configured to move when the hydraulic fluid pressure is increased. The dog clutch may include a first portion configured to move when the piston is moved and a second portion configured for engagement with the first portion. The constant velocity joint housing may be formed integrally with the second portion of the dog clutch. A wheel may be disconnected from the rear drive module unless engagement of the first portion and the second portion of the dog clutch allows torque to be transferred to the wheel.

In another embodiment, a wheel disconnect system may include a rear drive module and a constant velocity joint housing. The rear drive module may include a housing, at least one electromagnetic actuator at least partly disposed within the housing, and at least one dog clutch configured to be activated by the electromagnetic actuator. The electromagnetic actuator may include at least one ball, an armature plate proximate at least one ball, and a coil configured to move the armature plate and at least one ball when activated. The dog clutch may include a first portion configured to move when the balls and armature plate are moved and a second portion configured for engagement with the first portion. The constant velocity joint housing may be formed integrally with the second portion of the dog clutch. A wheel may be disconnected from the rear drive module unless engagement of the first portion and the second portion of the dog clutch allows torque to be transferred to the wheel.

A vehicle driveline including a wheel disconnect system is also provided. The vehicle driveline may include a rear drive axle; at least one wheel; at least one rear half shaft for distributing torque to the at least one wheel; and a wheel disconnect system. The wheel disconnect system may include a rear drive module and a constant velocity joint housing. The rear drive module may include a housing, at least one actuator at least partly disposed within the housing, and at least one dog clutch configured to be activated by the actuator. The dog clutch may include a first portion configured to move when the actuator is moved and a second portion configured for engagement with the first portion. The constant velocity joint housing may be formed integrally with the second portion of the dog clutch. A wheel may be disconnected from the rear drive module unless engagement of the first portion and the second portion of the dog clutch allows torque to be transferred to the wheel.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
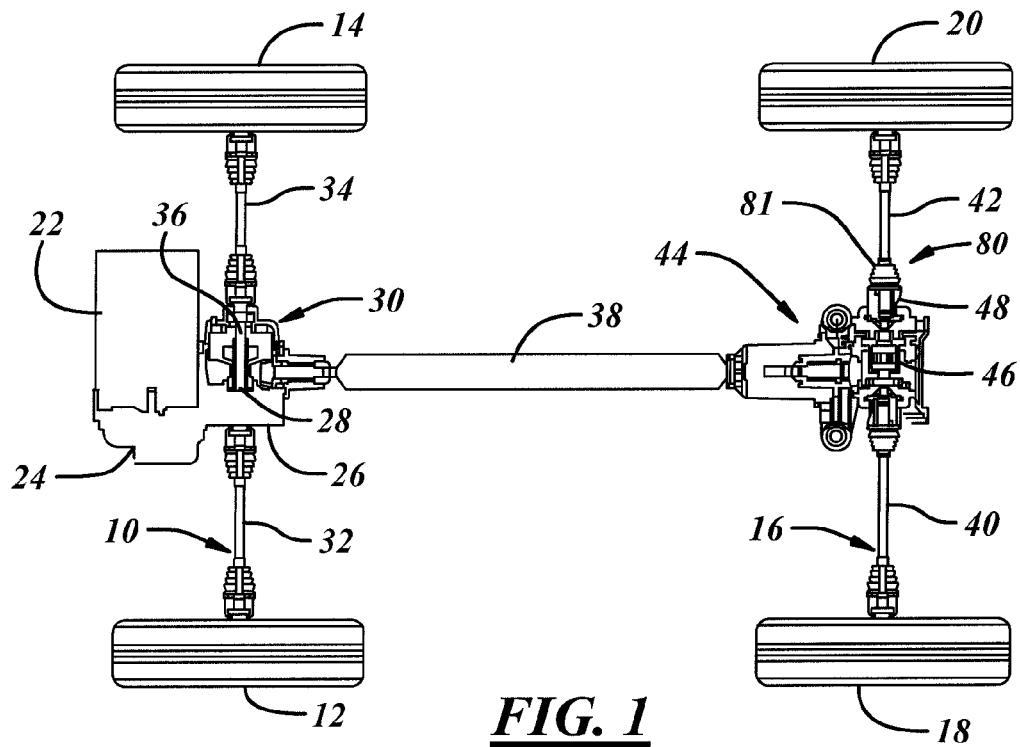
FIG. 1 illustrates an AWD vehicle driveline including a wheel disconnect system according to an embodiment of the present invention.

Referring to FIG. 1, an AWD vehicle driveline is generally shown. The AWD vehicle driveline may comprise a primary drive system and a secondary or auxiliary drive system. The primary drive system may comprise a primary front drive axle 10 and one or more primary drive wheels 12, 14. The secondary or auxiliary drive system may comprise a secondary or auxiliary rear drive axle 16 and one or more secondary or auxiliary drive wheels 18, 20. In an embodiment as illustrated, the primary drive system may include two primary drive wheels, and the secondary or auxiliary drive system may include two auxiliary drive wheels.

When the AWD vehicle driveline is operating in a 4×4 mode of operation (i.e., all four wheels transmit power to the road), torque may be transferred from an engine 22, through a transmission 24, and into a front driving differential case 26. The torque may be further split to a front driving differential 28 and a power transfer unit 30. The torque that is split through the front driving differential 28 (e.g., through the front driving differential gear set) may then be further distributed via front half shafts 32, 34 to a pair of primary (e.g., front) drive wheels 12, 14 of a motor vehicle. The torque distributed to power transfer unit 30 may be provided via a hollow shaft 36 that may directly connect the front driving differential case 26 to power transfer unit 30. The torque transferred through the power transfer unit 30 may drive a drive shaft 38 that in turn drives the rear drive axle 16.

Rear drive axle 16 may distribute torque via rear half shafts 40, 42 to a pair of auxiliary (e.g., rear) drive wheels 18, 20 of the motor vehicle. A wheel disconnect system 44 may be provided to selectively interrupt torque flow to the auxiliary drive wheels 18, 20. In accordance with an embodiment of the invention, wheel disconnect system 44 may include a rear drive module 46 and a constant velocity (CV) joint housing 48. Rear drive module 46 may comprise a hydraulically actuated rear drive module 46A as generally illustrated in FIG. 2 or an electromagnetically actuated rear drive module 46B as generally illustrated in FIG. 3.

Figure 2:
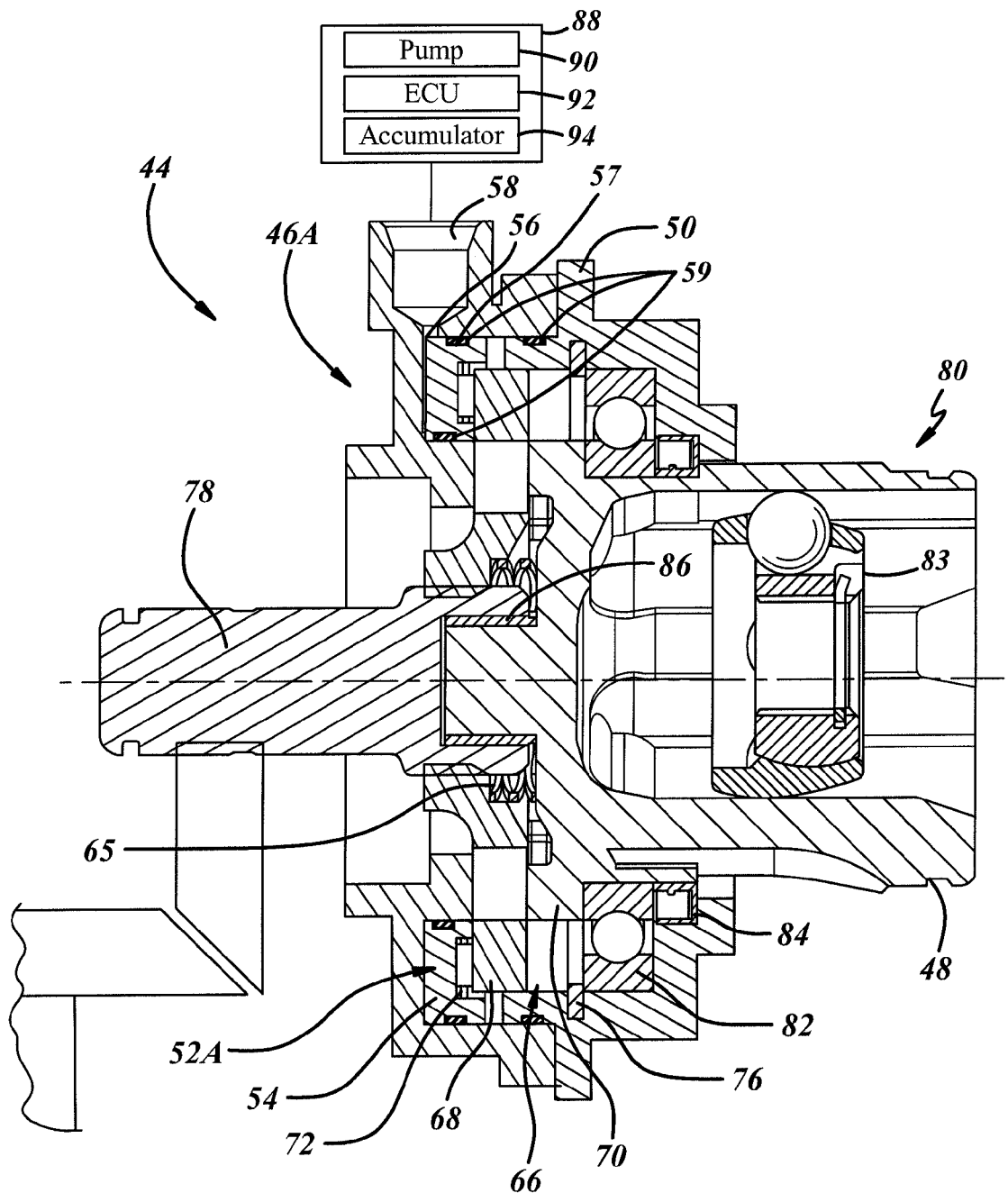
FIG. 2 is a cross-sectional view of a wheel disconnect system according to an embodiment of the present invention.

Referring now to FIG. 2, rear drive module 46A may include a housing 50. Housing 50 may be provided to at least partially house an actuator 52A disposed within housing 50. In a first embodiment of the invention, actuator 52A may comprise at least one hydraulic actuation piston 54. In accordance with the first embodiment of the invention, housing 50 may define at least one cavity 56 configured to be in communication with a source 88 of hydraulic fluid pressure. The source 88 of hydraulic fluid pressure may variably provide fluid pressure to the cavity 56. A hydraulic input and/or line connection 58 may allow hydraulic fluid from a source 88 of hydraulic fluid pressure to enter cavity 56 of the rear drive module 46A. The rear drive module 46A may include at least two cavities 56 in an exemplary embodiment. A separate hydraulic input and/or line connection 58 may be utilized for each of the two cavities 56 in an exemplary embodiment. In another exemplary embodiment, a single hydraulic input and/or line connection 58 may be used to input hydraulic fluid into both cavities for both wheels. It will be appreciated that the source 88 of hydraulic pressure is not limited to any particular hydraulic fluid pressure generating device, and may include without limitation, a pump, valves, accumulator, and electronic control unit (ECU), or any combination thereof. For example, a pump 90 may generate hydraulic pressure. A switch or signal from the ECU 92 may energize and/or control the pump 90. For example, the ECU 92 may keep an accumulator 94 (e.g., part of the hydraulic system of a motor vehicle which absorbs fluctuating fluid delivery, stores fluid at pressure, and can provide a rapid flow of fluid under pressure) charged to a select or predetermined pressure range as monitored by a pressure switch. For another example, the ECU 92 may directly pressurize the rear drive module 46A. In another example, the source 88 of hydraulic pressure may be the pressurized fluid from an automatic transmission.

In accordance with the first embodiment of the invention, at least one piston 54 may be disposed in cavity 56. Piston 54 may be configured to move when the hydraulic fluid pressure is increased. Piston 54 may be configured to move axially within cavity 56. The rear drive module 46A may include at least two pistons 54 in an exemplary embodiment (e.g., one piston for each rear wheel). Piston 54 may also define at least one pocket 57. Each pocket 57 may be configured to receive an o-ring seal 59. In an embodiment, there may be an o-ring seal 59 on the inner diameter and outer diameter of the piston 54.

Figure 3:
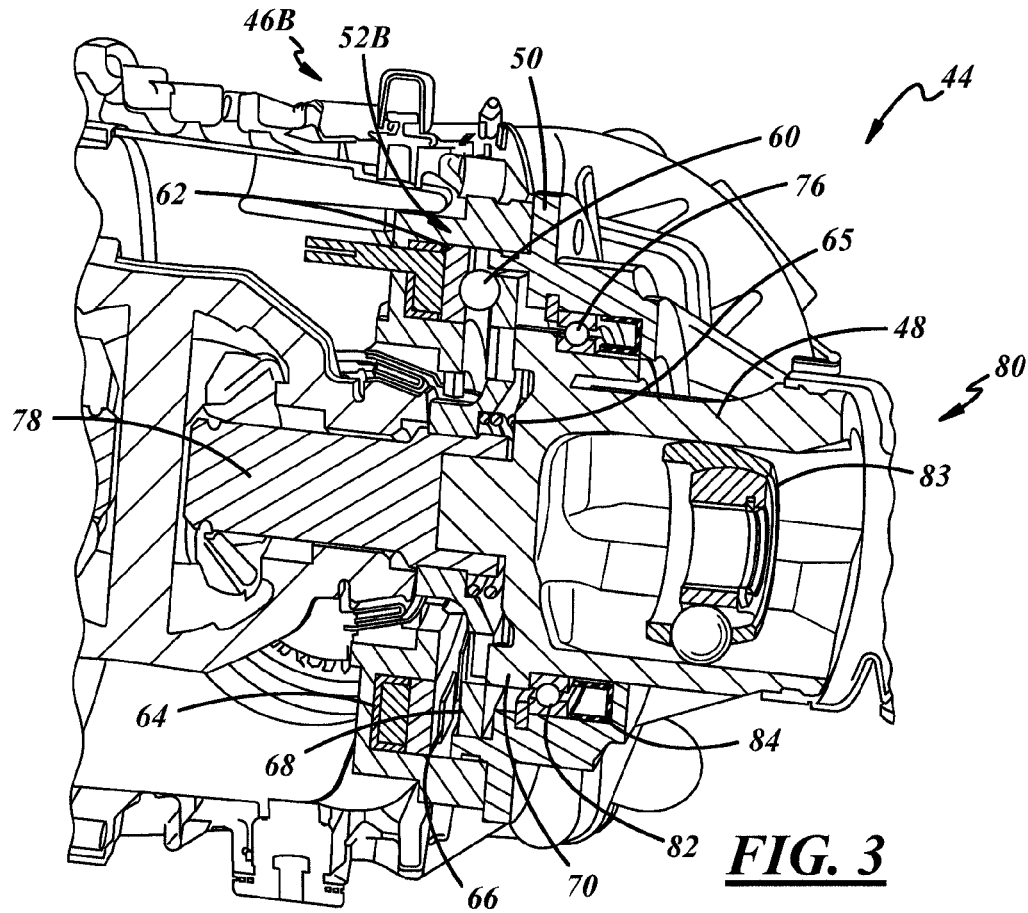
FIG. 3 is a cross-sectional view of a wheel disconnect system according to an embodiment of the present invention.

Referring now to FIG. 3, in a second embodiment of the invention, actuator 52B may comprise at least one electromagnetic ball ramp actuator. The electromagnetic ball ramp actuator 52B may comprise at least one ball 60, an armature plate 62, a coil 64, and a spring 65. The electromagnetic ball ramp actuator 52B may function in a conventional manner, such as known in the art. The electromagnetic ball ramp actuator 52B may be at least partly disposed within the housing 50. Coil 64 may be configured to generate an electromagnetic field that may affect a position of the armature plate 62. In particular, the coil 64 may restrain the armature plate 62 from moving at the same speed as plate portion 68. Plate portion 68 may comprise a first portion of a dog clutch 66 as described in additional detail below. Both armature plate 62 and plate portion 68 of dog clutch 66 may each include a ramp in which balls 60 may be configured to travel. Because coil 64 may restrain the armature plate 62 from moving at the same speed as plate 68, balls 60 may be allowed to move up the ramps in armature plate 62 and plate portion 68 of the dog clutch 66. The movement of the balls 60 may move the plate portion 68 of the dog clutch 66 away from armature plate 62, thereby allowing the dog clutch 66 (e.g., first plate portion 68 and second portion 70 as described in more detail below) to engage. When the balls 60 are at the end of its travel, the armature plate 62 may be spinning and/or rotating at the same speed as plate portion 68. Upon deenergization of the coil 64, a spring 65 may be configured to act on the armature plate 62. The action of the spring 65 may result in a decrease in the total thickness of the electromagnetic ball ramp actuator 52B as compared to when the coil 64 is energized. The rear drive module 46B may include at least two electromagnetic ball ramp actuators 52B in an exemplary embodiment (e.g., one electromagnetic ball ramp actuator for each rear wheel).

Actuator 52 may be configured to activate a dog clutch 66. The rear drive module 46 may include at least two dog clutches 66 in an exemplary embodiment (e.g., one dog clutch for each rear wheel). Referring now to both FIGS. 2 and 3, dog clutch 66 may comprise a first portion 68 and a second portion 70. The first portion 68 of the dog clutch 66 may comprise an axially moveable collar. The axially moveable collar may include dog clutch features on its radially inner face. The shape and function of dog clutch features may be as are known in the art. For example, the axially moveable collar may include projections that are configured to engage corresponding slots (e.g., slots, grooves, recesses, receiving portions) in the second portion 70 of the dog clutch 66.

The position of the first portion 68 may be configured to be affected by actuator 52. In accordance with a first embodiment of the invention, the first portion 68 of the dog clutch 66 may be configured to be activated and/or move when piston 54 is moved. In this first embodiment, a bearing 72 may be disposed between the piston 54 and the first portion 68 of the dog clutch 66 to allow for rotation of the first portion of the dog clutch 68 relative to the piston 54. In accordance with a second embodiment of the invention, the position of the first portion 68 of the dog clutch 66 may be configured to depend on whether the coil 64 of the electromagnetic ball ramp actuator 52B is energized and/or deenergized, thereby allowing and/or preventing movement of the balls 60. Movement of balls 60 may then activate and/or move the first portion 68 of the dog clutch 66.

The second portion 70 of the dog clutch 66 may be configured for engagement with the first portion 68. In at least the first embodiment, a biasing member (e.g., a resilient biasing member), such as a compression spring 65, may apply a force against the first portion 68 of the dog clutch 66 in a direction away from engagement of the first portion of the dog clutch 66 with the second portion 70 of the dog clutch 66. Although a compression spring is mentioned in detail, other biasing members may be utilized in other embodiments. The wheel disconnect system 44 may provide for left and right rear wheels 18, 20 and left and right half shafts 40, 42 to be disconnected from the rear drive module 46 in a default and/or normal position. To connect rear wheels 18, 20 and/or rear half shafts 40, 42 to the rear drive module 46 for the AWD feature of the motor vehicle, engagement of the first and second portions 68, 70 of the dog clutch 66 may allow torque to be transferred to each wheel. To connect rear wheels 18, 20 to the rear drive module 46A or 46B, the actuator 52 may be used to affect movement of the dog clutch 66 such that first and second portions 68, 70 of the dog clutch are engaged. Accordingly, the wheel disconnect system 44 may be configured for selectively connecting and disconnecting the rear half shafts 40, 42 and rear wheels 18, 20 from the rear drive module 46 using the actuator 52 and dog clutch 66.

The torque distributed to the rear drive module 46 may be provided via a differential that facilitates differential rotation between a pair of output shafts (e.g., an output shaft 78), for example, as is known in the art. The output shaft 78 may include splines and may be in splined engagement with the first portion 68 of the dog clutch 66.

Wheel disconnect system 44 may include a constant velocity (CV) joint housing 48 for a CV joint 80. CV joints are provided generally to connect shafts to drive units and are common in motor vehicles. CV joints may be located at both ends of the rear half shafts 40, 42 that connect to the wheels 18, 20 and the rear drive module 46, as generally shown in FIG. 1. The CV joints 80 may be any of the standard types known in the art, including but not limited to a ball joint, such as a six ball joint, an eight ball joint, or a ten ball joint, a plunging tripod joint, a cross groove joint, a fixed ball joint, a fixed tripod joint, or a double offset joint. The CV joint 80 may include any number of various components, such as a joint boot 81 and inner CV joint portion 83, that are conventional in the art. The inner CV joint portion 83 is schematically illustrated in FIGS. 2-3 and may include components of a standard ball joint as referenced above and as known to those in the art. The CV joint housing 48 may be substantially similar to a conventional CV joint housing known in the art, but the CV joint housing may be formed integrally with the second portion 70 of the dog clutch 66. The CV joint housing and second portion 70 of the dog clutch 66 may, for example, be a one-piece and/or monolithic structure.

The wheel disconnect system 44 may further include a bearing 82 disposed between the housing 50 of the rear drive module 46 and the CV joint housing 48. The bearing 82 may be configured to rotatably support the CV joint housing 48. The rear drive module 46 may further comprise a retaining clip 76 in order to retain the bearing 82. The retaining clip 76 may be at least partially disposed within the housing 50 of the rear drive module 46 or may be integral with the housing 50 of the rear drive module 46. A seal 84 may also be disposed between the housing 50 of the rear drive module 46 and the CV joint housing 48. The seal 84 may be configured to avoid leakage of lubricating oil from the rear drive module 46. The wheel disconnect system 44 may also include a bushing disposed between the output shaft 78 and the CV joint housing 48. The bushing 86 may be configured for dampening noise or friction.

A wheel disconnect system in accordance with the present invention may allow for selective disconnection and connection of the rear half shafts and wheels from a rear drive module. Accordingly, the inventive wheel disconnect system may be configured to disconnect the rear half shaft from the rear drive module, rather than at the wheel ends. By integrating the CV joint as part of the dog clutch of the rear drive module, the wheel disconnect system may be further simplified while reducing package size and component count of the wheel disconnect system. For example, a wheel disconnect system in accordance with the present invention may not require a viscous coupling which may result weight savings. A wheel disconnect system in accordance with the present invention may also improve fuel economy by eliminating ring gears and differential viscous spin losses and mechanical rotational losses. A wheel disconnect system in accordance with the present invention may also be configured for use with existing vehicle mounts with no required modification to existing rear half shafts.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:
1. A wheel disconnect system, comprising:
   a rear drive module comprising:
      a housing;
      an output shaft at least partially disposed within the housing;
      at least one actuator at least partly disposed within the housing; and
      at least one dog clutch separately formed from the output shaft and configured to be activated by the actuator, the dog clutch including:
         a first portion in engagement with the output shaft, the first portion configured to move when at least a portion of the actuator is moved; and
         a second portion configured for engagement and disengagement with the first portion; and a constant velocity joint housing, wherein the constant velocity joint housing is formed as one piece with the second portion of the dog clutch;
an inner constant velocity joint portion at least partially disposed within the constant velocity joint housing; and
a rear half shaft configured for connection to the inner constant velocity joint portion, wherein the wheel disconnect system is configured to selectively connect and disconnect the rear half shaft from the rear drive module and wherein the rear half shaft is disconnected from the rear drive module unless the dog clutch is activated and permits torque to be transferred to the rear half shaft.

2. The wheel disconnect system in accordance with claim 1, wherein the first portion of the dog clutch comprises an axially moveable collar.

3. The wheel disconnect system in accordance with claim 2, wherein the axially moveable collar includes projections that are configured to engage corresponding slots in the second portion of the dog clutch.

4. The wheel disconnect system in accordance with claim 1, further comprising a biasing member for applying a force against the first portion of the dog clutch in a direction away from engagement of the first portion of the dog clutch with the second portion of the dog clutch.

5. The wheel disconnect system in accordance with claim 4, wherein the biasing member comprises a spring.

6. The wheel disconnect system in accordance with claim 1, further comprising a bearing disposed between the housing of the rear drive module and the constant velocity joint housing configured to rotatably support the constant velocity joint housing.

7. The wheel disconnect system in accordance with claim 1, further comprising a seal disposed between the housing of the rear drive module and the constant velocity joint housing to avoid leakage of lubricating oil.

8. The wheel disconnect system in accordance with claim 1, further comprising a retaining clip disposed within the housing for the rear drive module to retain a bearing.

9. The wheel disconnect system in accordance with claim 1, further comprising a bushing disposed between the output shaft and the constant velocity joint housing.

10. The wheel disconnect system in accordance with claim 1, wherein the actuator comprises an electromagnetic actuator comprising:
at least one ball;
an armature plate proximate at least one ball;
a coil configured to generate an electromagnetic field to affect a position of the armature plate; and
a spring configured to act on the armature plate when the coil is deenergized, wherein the dog clutch is configured to be activated by movement of at least one ball when the position of the armature plate is affected by the electromagnetic field.

11. The wheel disconnect system in accordance with claim 1, wherein the housing defines a cavity configured to be in communication with a source of hydraulic fluid pressure and the actuator comprises at least one piston disposed in the cavity; the piston configured to move when the hydraulic fluid pressure is increased; and the dog clutch configured to be activated by the movement of the piston.

12. The wheel disconnect system in accordance with claim 11, further comprising a pump for generating hydraulic fluid pressure.

13. The wheel disconnect system in accordance with claim 12, further comprising an electronic control unit for controlling the pump.

14. The wheel disconnect system in accordance with claim 11, wherein the rear drive module further comprises an accumulator for storing hydraulic fluid pressure.

15. The wheel disconnect system in accordance with claim 11, further comprising a bearing disposed between the piston and the first portion of the dog clutch to allow for rotation of the first portion of the dog clutch relative to the piston.

16. A wheel disconnect system, comprising:
a rear drive module comprising:
a housing including a cavity configured for communication with a source of hydraulic fluid pressure;
at least one piston disposed in the cavity, the piston configured to move with respect to a change in hydraulic fluid pressure;
an output shaft at least partially disposed within the housing; and
at least one dog clutch separately formed from the output shaft and configured to be activated by the piston, the dog clutch including:
a first portion in engagement with the output shaft, the first portion configured to move when the piston is moved; and
a second portion configured for engagement and disengagement with the first portion;
a constant velocity joint housing, wherein the constant velocity joint housing is formed as one piece with the second portion of the dog clutch;
an inner constant velocity joint portion at least partially disposed within the constant velocity joint housing; and
a rear half shaft configured for connection to the inner constant velocity joint portion, wherein the wheel disconnect system is configured to selectively connect and disconnect the rear half shaft from the rear drive module and wherein the rear half shaft is disconnected from the rear drive module unless engagement of the first portion and the second portion of the dog clutch allows torque to be transferred to the rear half shaft.

17. A wheel disconnect system, comprising:
a rear drive module comprising:
a housing;
at least one electromagnetic actuator at least partly disposed within the housing, the electromagnetic actuator comprising:
at least one ball;
an armature plate proximate at least one ball;
a coil configured to generate an electromagnetic field to affect a position of the armature plate; and
a spring configured to act on the armature plate when the coil is deenergized;
an output shaft at least partially disposed within the housing;
at least one dog clutch separately formed from the output shaft and configured to be activated by the movement of at least one ball when the position of the armature plate is affected by the electromagnetic field, the dog clutch comprising:
a first portion in engagement with the output shaft, the first portion configured to move when at least one ball and armature plate are moved; and
a second portion configured for engagement and disengagement with the first portion;
a constant velocity joint housing, wherein the constant velocity joint housing is formed as one piece with the second portion of the dog clutch;
an inner constant velocity joint portion at least partially disposed within the constant velocity joint housing; and a rear half shaft configured for connection to the inner constant velocity joint portion, wherein the wheel disconnect system is configured to selectively connect and disconnect the rear half shaft from the rear drive module and wherein the rear half shaft is disconnected from the rear drive module unless engagement of the first portion and the second portion of the dog clutch allows torque to be transferred to the rear half shaft.

18. A vehicle driveline, comprising:
at least one wheel;
at least one rear half shaft for distributing torque to the at least one wheel; and
a wheel disconnect system, comprising:
   a rear drive module comprising:
      a housing;
      an output shaft at least partially disposed within the housing;
      at least one actuator at least partly disposed within the housing;
         at least one dog clutch separately formed from the output shaft and configured to be activated by the actuator, the dog clutch including:
            a first portion in engagement with the output shaft, the first portion configured to move when at least a portion of the actuator is moved;
            a second portion configured for engagement and disengagement with the first portion;
      a constant velocity joint housing, wherein the constant velocity joint housing is formed as one piece with the second portion of the dog clutch; and
      an inner constant velocity joint portion at least partially disposed within the constant velocity joint housing, wherein the rear half shaft is configured for connection to the inner constant velocity joint portion;
wherein the wheel disconnect system is configured to selectively connect and disconnect the rear half shaft and the wheel from the rear drive module and wherein the rear half shaft and the wheel are disconnected from the rear drive module unless the dog clutch is activated and permits torque to be transferred to the rear half shaft and the wheel.

* * * * *